(12) United States Patent
Fang et al.

(10) Patent No.: US 7,940,849 B1
(45) Date of Patent: May 10, 2011

(54) METHOD AND APPARATUS FOR ESTIMATION OF CARRIER FREQUENCY OFFSET AND/OR SAMPLING FREQUENCY OFFSET

(75) Inventors: Jing Fang, San Jose, CA (US);
Runsheng He, Sunnyvale, CA (US);
Kok-Wui Cheong, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 931 days.

(21) Appl. No.: 11/842,717

(22) Filed: Aug. 21, 2007

Related U.S. Application Data

(60) Provisional application No. 60/823,576, filed on Aug. 25, 2006.

(51) Int. Cl.
*H04L 27/28* (2006.01)

(52) U.S. Cl. ........................................ 375/260

(58) Field of Classification Search .................. 375/260, 375/261, 346, 348, 350
See application file for complete search history.

(56) References Cited

U.S. PATENT DOCUMENTS

| | | | | |
|---|---|---|---|---|
| 2004/0109508 | A1* | 6/2004 | Jeon et al. | 375/260 |
| 2005/0213680 | A1* | 9/2005 | Atungsiri et al. | 375/260 |
| 2006/0285599 | A1* | 12/2006 | Seki et al. | 375/260 |
| 2007/0041312 | A1* | 2/2007 | Kim | 370/208 |

OTHER PUBLICATIONS

IEEE Std 802.16-2004, "802.16: IEEE Standard for Local and Metropolitan Area Networks, Part 16: Air Interface for Fixed Broadband Wireless Access Systems," *IEEE*, Oct. 1, 2004.

IEEE Std. 802.11a-1999, "Supplement to IEEE Standard for Information Technology-Telecommunications and information exchange between systems- Local and metropolitan area networks- Specific requirements- Part 11: Wireless LAN Medium Access Control (MAC) and Physical Layer (PHY) specifications: High-Speed Physical Layer in the 5 GHZ Band," *IEEE*, Dec. 30, 1999.

IEEE Std. 802.11g/D2.8 (Supplement to ANSI/IEEE Std 802.11, 1999 Edition), "DRAFT Supplement to STANDARD [for] Information Technology-Telecommunications and information exchange between systems-Local and metropolitan area networks-Specific requirements-Part 11: Wireless LAN Medium Access Control (MAC) and Physical Layer (PHY) specifications: Further Higher-Speed Physical Layer Extension in the 2.4 GHz Band," *IEEE*, May 2002.

IEEE 802.20 V14, "Draft 802.20 Permanent Document, System Requirements for IEEE 802.20 Mobile Broadband Wireless Access Systems—Version 14," *IEEE Working Group 802.20*, Jul. 16, 2004.

* cited by examiner

*Primary Examiner* — Don N Vo

(57) ABSTRACT

In a method for determining timing information in a receiver, a first signal is analyzed to determine a first phase difference with respect to different portions of the first signal, and a second signal is analyzed to determine a second phase difference with respect to different portions of the second signal. The second signal is a frequency domain representation of at least a portion of the first signal. An indication of a carrier frequency offset and a sampling period offset are generated based on the first phase difference and the second phase difference.

61 Claims, 7 Drawing Sheets

METHOD AND APPARATUS FOR ESTIMATION OF CARRIER FREQUENCY OFFSET AND/OR SAMPLING FREQUENCY OFFSET

CROSS-REFERENCE TO RELATED APPLICATION

The present application claims the benefit of U.S. Provisional Application No. 60/823,576, entitled "A JOINT CARRIER FREQUENCY OFFSET AND SAMPLE FREQUENCY ESTIMATION FOR DVB RECEIVER," filed on Aug. 25, 2006, which is hereby incorporated by reference herein in its entirety.

FIELD OF TECHNOLOGY

The present disclosure relates generally to communication devices, and more particularly, to techniques for estimating a carrier frequency offset and a sampling period offset.

DESCRIPTION OF THE RELATED ART

Orthogonal frequency-division multiplexing (OFDM) is a digital multi-carrier modulation scheme that employs a large number of relatively closely spaced orthogonal sub-carriers. Each sub-carrier is itself modulated with a modulation scheme such as quadrature amplitude modulation, phase shift keying, etc., at a relatively low symbol rate. Even though data on a particular sub-carrier is modulated at a low symbol rate, the large number of sub-carriers provides an overall data rate similar to single-carrier modulation schemes that utilize the same bandwidth. An advantage of OFDM over single-carrier modulation schemes is its ability to cope with severe channel conditions such as, multipath and narrowband interference. For instance, the relatively low symbol rate allows the use of a guard interval between symbols to help manage time-domain spreading of the signal due to multipath propagation.

Some OFDM systems utilize pilots for synchronization, channel estimation, etc., for example. In these systems, pilot signals may be sent in one more sub-channels. The sub-channels in which a pilot is sent may be the same for each OFDM symbol or it may vary between OFDM symbols.

Some digital video broadcast (DVB) systems, such as the DVB-T (Digital Video Broadcasting-Terrestrial) standard, utilize OFDM. FIG. 1 is a block diagram of a DVB system 100 that utilizes OFDM. The DVB system 100 includes a transmitter 104 and a receiver 108. The transmitter includes a quadrature amplitude modulation (QAM) modulator 120 coupled to an inverse fast Fourier transform (IFFT) block 124. The QAM modulator 120 may comprise $N_V$ parallel QAM modulators and a multiplexer that feeds an information signal s(i) to the $N_V$ parallel modulators. Each of the $N_V$ parallel QAM modulators may generate a modulated signal stream corresponding to one of N sub-carriers, where $N_V$ is typically less than N. In other words, the QAM modulator 120 modulates an information signal s(i) to generate $N_V$ QAM modulated signals.

A set of N signals $X_0(j), X_1(j), \ldots, X_{N-1}(j)$, which includes the $N_V$ QAM modulated signals and other signals such as pilot signals, transmit parameter signals, etc., and which correspond to the N sub-carriers, are provided to an IFFT block 124. The IFFT block 124 performs an IFFT operation on the set of N modulated signals $X_0(j), X_1(j), \ldots, X_{N-1}(j)$ to generate a set of N signal samples x(n), x(n+1), ..., x(n+N) that correspond to one OFDM symbol.

The receiver also includes a guard interval inserter 128 coupled to the IFFT block 124. The guard interval inserter 128 inserts a guard interval between OFDM symbols, such as by inserting a guard interval at the beginning of each OFDM symbol. The length of the guard interval is typically some predetermined fraction of the length of the OFDM symbol (e.g., ¼ the OFDM symbol length, ⅛, 1/16, 1/32, etc.). The guard interval may include a cyclic prefix, which is merely a copy of an ending portion of the OFDM symbol. In other words, the guard interval inserter 128 may copy an ending portion of the OFDM symbol, the portion being of some predetermined length M, and position it before the beginning of the OFDM symbol. Thus, upon receiving the set of N signal samples x(n), x(n+1), ..., x(n+N−1), the guard interval inserter 128 may create the sequence x(n+N−M), x(n+N−M+1), ..., x(n+N−1), x(n), x(n+1), ..., x(n+N−1), where the samples x(n+N−M), x(n+N−M+2), ..., x(n+N−1) correspond to the guard interval and the samples x(n), x(n+1), ..., x(n+N−1) correspond to the OFDM symbol.

A digital-to-analog converter (DAC) 132 is coupled to the guard interval inserter 128 and converts the samples x(n) to an analog signal. The sampling period corresponding to the DAC 132 is denoted as T. A radio frequency (RF) modulator 136 is coupled to the DAC 132 and modulates the output of the DAC 132 on a carrier frequency $f_c$ to generate a signal y(t) which is transmitted to the receiver 108.

At the receiver, a modified version of the signal y(t) is received. For example, the signal y(t) may be modified due to, for example, multipath interference, additive noise, etc. The receiver includes an RF demodulator 150 coupled to an analog-to-digital converter (ADC) 154. The RF demodulator 150 ideally demodulates the received signal by shifting the received signal by exactly $f_c$. In reality, however, the demodulator 150 typically shifts the received signal by a frequency $f_c'$ which is slightly different than $f_c$, resulting in a frequency offset, $$\Delta f_c = f_c - f_c'.$$

The ADC 154 samples the demodulated received signal. Ideally, the ADC 154 samples the received signal at exactly the same sampling period T corresponding to the DAC 132. In reality, however, the sampling period T' of the ADC 154 is slightly different from T, resulting in an offset, $\Delta T = T' - T$. The output of the DAC 132 is a signal $\hat{y}(n)$.

A timing and frequency correction block 158 is coupled to the DAC 132. The timing and frequency correction block 158 processes the signal $\hat{y}(n)$ to compensate for the carrier frequency offset $\Delta f_c$ and the sampling period offset $\Delta T$. Estimates of the frequency offset $\Delta f_c$ and the sampling period offset $\Delta T$ are provided to the timing and frequency correction block 158 by a carrier frequency offset estimator 162 and a sampling period offset estimator 166, respectively. The output of the timing and frequency correction block 158 includes a signal $\hat{x}(n)$ that corresponds to the signal x(n) in the transmitter 104. The output of the timing and frequency correction block 158 may also include a signal corresponding to the guard interval inserted by the transmitter 104.

The carrier frequency offset estimator 162 is coupled to the timing and frequency correction block 158. The carrier frequency offset estimator 162 estimates $\Delta f_c$ based on the signal $\hat{x}(n)$ and the signal corresponding to the guard interval. The carrier frequency offset estimator 162 estimates $\Delta f_c$ by calculating a phase difference between a sample of the cyclic prefix and the corresponding sample in the OFDM symbol. In particular, the carrier frequency offset estimator 162 estimates $\Delta f_c$ based on the following equation:

$$\Delta f_c = \frac{\phi_{n+N} - \phi_n}{2\pi NT} \quad \text{Equ. 1}$$

where $\phi_n$ is a phase of a sample in the cyclic prefix and $\phi_{n+N}$ is a phase of a sample in the OFDM symbol that corresponds to the sample in the cyclic prefix. The carrier frequency offset estimator 162 provides the estimate of $\Delta f_c$ to the timing and frequency correction block 158.

A fast Fourier transform (FFT) block 170 is coupled to the timing and frequency correction block 158. The FFT block 170 performs an FFT operation on a set of N samples of the signal $\hat{x}(n)$ corresponding to an OFDM symbol and, optionally, on the corresponding cyclic prefix. The FFT block 170 generates a set of N signals $\hat{X}_0(j), \hat{X}_1(j), \ldots, \hat{X}_{N-1}(j)$ that correspond to the N signals $X_0(k), X_1(k), \ldots, X_{N-1}(k)$ generated at the transmitter 104. The N signals generated by the FFT block 170 may include $N_V$ QAM modulated signals (corresponding to the output of the QAM modulator 120 at the transmitter 104) and other signals such as pilot signals and transmit parameter signals, for example.

The sampling period offset estimator 166 is coupled to the FFT block 170. The sampling period offset estimator 166 estimates $\Delta T$ based on one or more of the signals $\hat{X}_0(j), \hat{X}_1(j), \ldots, \hat{X}_{N-1}(j)$. The sampling period offset estimator 166 estimates $\Delta T$ by calculating a phase difference between a pilot corresponding to a first OFDM symbol and the same pilot, but corresponding to a second OFDM symbol. In particular, the sampling period offset estimator 166 estimates $\Delta T$ based on the following equation:

$$\Delta T = \frac{\Phi_{k,m+N+M} - \Phi_{k,m}}{2\pi k(N + M)} NT \quad \text{Equ. 2}$$

where $\Phi_{k,m}$ is a phase of a pilot, where k is an index indicating the frequency of the pilot, where m is an index indicating the OFDM symbol to which the pilot phase $\Phi_{k,m}$ corresponds, where $\Phi_{k,m+N+M}$ is the phase of the same pilot but in the next OFDM symbol. The sampling period offset estimator 166 provides the estimate of $\Delta T$ to the timing and frequency correction block 158.

A demodulator 174 receives the $N_V$ QAM modulated signals from the FFT block 170 and demodulates each of the $N_V$ signals to generate an information signal $\hat{s}(i)$ that corresponds to the information signal $s(i)$ at the transmitter. The demodulator 174 may comprise $N_V$ parallel QAM demodulators and a demultiplexer that generates the serial information signal $\hat{s}(i)$ from the $N_V$ parallel demodulators in a manner that generally corresponds to the reverse operation of the modulator 120.

SUMMARY OF THE DISCLOSURE

In one embodiment, a method for determining timing information in a receiver includes analyzing a first signal to determine a first phase difference with respect to different portions of the first signal, and analyzing a second signal to determine a second phase difference with respect to different portions of the second signal. The second signal is a frequency domain representation of at least a portion of the first signal. The method also includes generating an indication of a sampling period offset based on the first phase difference and the second phase difference. In other embodiments, the method may include, in addition to or alternative to generating the indication of the sampling period offset, generating an indication of a carrier frequency offset based on the first phase difference and the second phase difference.

In another embodiment, an apparatus for calculating timing information for a receiver comprises a first phase difference calculator to calculate a first phase difference with respect to different portions of a first signal, and a second phase difference calculator to calculate a second phase difference with respect to different portions of a second signal. The second signal is a frequency domain representation of at least a portion of the first signal. The apparatus additionally comprises a sampling period offset information calculator to generate an indication of a sampling period offset based on the first phase difference and the second phase difference. In other embodiments, the apparatus may comprise, in addition to or alternative to the sampling period offset information calculator, a carrier frequency offset information calculator to generate an indication of a carrier frequency offset based on the first phase difference and the second phase difference.

In yet another embodiment, a method for receiving an orthogonal frequency-division multiplexing (OFDM) signal includes demodulating a received radio frequency (RF) signal, and analog-to-digital converting the RF demodulated signal to generate an OFDM signal. Additionally, the method includes analyzing the OFDM signal to determine a first phase difference with respect to different portions of the OFDM signal. The method also includes performing a Fourier transform operation on at least a portion of the OFDM signal to generate a Fourier transformed signal, and analyzing the Fourier transformed signal to determine a second phase difference with respect to different portions of the Fourier transformed signal. The method further includes generating an indication of a sampling period offset based on the first phase difference and the second phase difference, and compensating for the sampling period offset based on the indication of the sampling period offset. In other embodiments, the method may include, in addition to or alternative to generating the indication of the sampling period offset and compensating for the sampling period offset, generating an indication of a carrier frequency offset based on the first phase difference and the second phase difference, and compensating for the carrier frequency offset based on the indication of the carrier frequency offset.

In still another embodiment, an orthogonal frequency-division multiplexing (OFDM) receiver apparatus comprises a radio frequency (RF) demodulator, and an analog-to-digital converter (ADC) having an input coupled to an output of the RF demodulator. The apparatus also comprises a Fourier transform calculator having an input coupled to an output of the ADC, and a quadrature amplitude modulation (QAM) demodulator having an input coupled to an output of the Fourier transform calculator. Additionally, the apparatus comprises a first phase difference calculator coupled to output of the ADC, the first phase difference calculator to determine a first phase difference with respect to different portions of an OFDM signal. Further, the apparatus comprises a second phase difference calculator coupled to output of the Fourier transform calculator, the second phase difference calculator to determine a second phase difference with respect to a frequency domain representation of at least a portion of the OFDM signal. Also, the apparatus comprises a sampling period offset calculator to generate an indication of a sampling period offset based on the first phase difference and the second phase difference. Further, the apparatus comprises a timing correction device to compensate for the sampling period offset based on the indication of the sampling period offset generated by the sampling period offset calculator. In other embodiments, the apparatus may comprise, in addition to or alternative to the sampling period offset calculator, a carrier frequency offset information calculator to generate an indication of a carrier frequency offset based on the first phase difference and the second phase difference. In these other embodiments, the timing correction device is coupled to the carrier frequency offset calculator, and the timing correction device may, in addition to or alternative to being configured to compensate for the sampling period offset, be configured to compensate for the carrier frequency offset based on the indication of the carrier frequency offset generated by the carrier frequency offset calculator.

DETAILED DESCRIPTION

The phase difference between a sample of the cyclic prefix and the corresponding sample in the OFDM symbol discussed above with respect to Equ. 1 is caused by both the carrier frequency offset $\Delta f_c$ and the sampling period offset $\Delta T$. In particular, this dependency can be represented by the following equation:

$$\phi_{n+N} - \phi_n = 2\pi N \Delta f_c (\Delta T + T) \quad \text{Equ. 3}$$

where $\phi_n$ is a phase of a sample in the cyclic prefix and $\phi_{n+N}$ is a phase of a sample in the OFDM symbol that corresponds to the sample in the cyclic prefix. Additionally, the phase difference between a pilot in a first OFDM symbol and the same pilot in an adjacent second OFDM symbol discussed above with respect to Equ. 2 is also caused by both the carrier frequency offset $\Delta f_c$ and the sampling period offset $\Delta T$. In particular, this dependency can be represented by the following equation:

$$\Phi_{k,m+N+M} - \Phi_{k,m} = 2\pi \left[ \frac{k \Delta T}{T} + \Delta f_c N (\Delta T + T) \right] \frac{N+M}{N} \quad \text{Equ. 4}$$

where $\Phi_{k,m}$ is a phase of the pilot, where k is an index indicating the frequency of the pilot, where m is an index indicating the OFDM symbol to which the pilot phase $\Phi_{k,m}$ corresponds, where $\Phi_{k,m+N+M}$ is the phase of the same pilot but in the next OFDM symbol.

Using Equations 3 and 4 to solve for the carrier frequency offset $\Delta f_c$ and the sampling period offset $\Delta T$ results in:

$$\Delta T = \left[ (\Phi_{k,m+N+M} - \Phi_{k,m}) \frac{N}{N+M} - (\phi_{n+N} - \phi_n) \right] \frac{T}{2\pi k} \quad \text{Equ. 5}$$

$$\Delta f_c = \frac{k(N+M)(\phi_{n+N} - \phi_n)}{[(\Phi_{k,m+N+M} - \Phi_{k,m})N - (\phi_{n+N} - \phi_n)(N+M) + 2\pi k(N+M)]NT} \quad \text{Equ. 6}$$

Thus, the carrier frequency offset $\Delta f_c$ can be estimated based on both $\phi_{n+N} - \phi_n$ and $\Phi_{k,m+N+M} - \Phi_{k,m}$. Similarly, the sampling period offset $\Delta T$ can be estimated based on both $\phi_{n+N} - \phi_n$ and $\Phi_{k,m+N+M} - \Phi_{k,m}$. Calculating estimates of the carrier frequency offset $\Delta f_c$ and the sampling period offset $\Delta T$ according to Equations 5 and 6 should in general, at least in most implementations, provide better estimates as compared to the techniques that calculate estimates according to the Equations 1 and 2.

Figure 1:
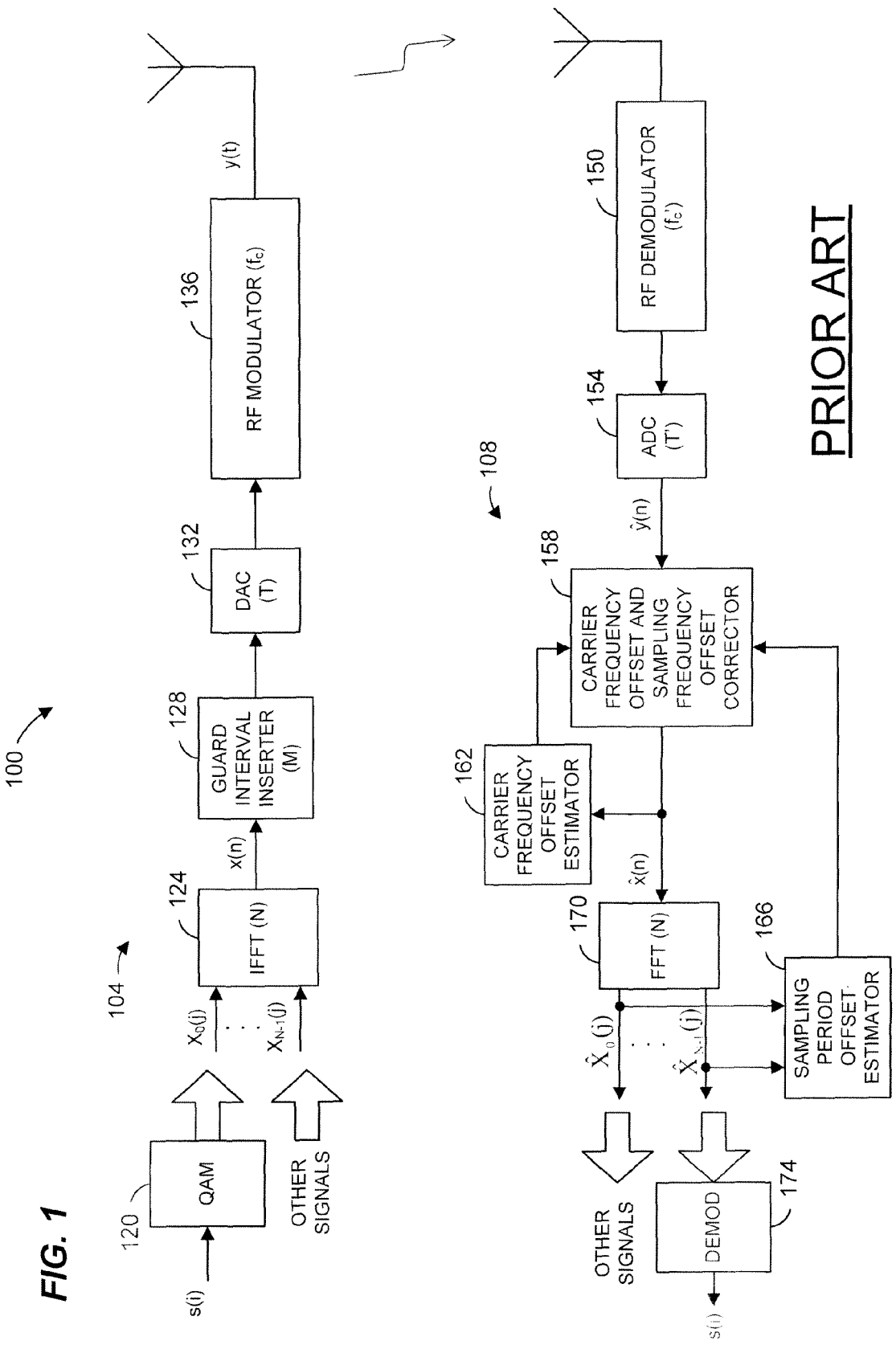
FIG. 1 a block diagram of a prior art digital video broadcasting (DVB) system.
Figure 2:
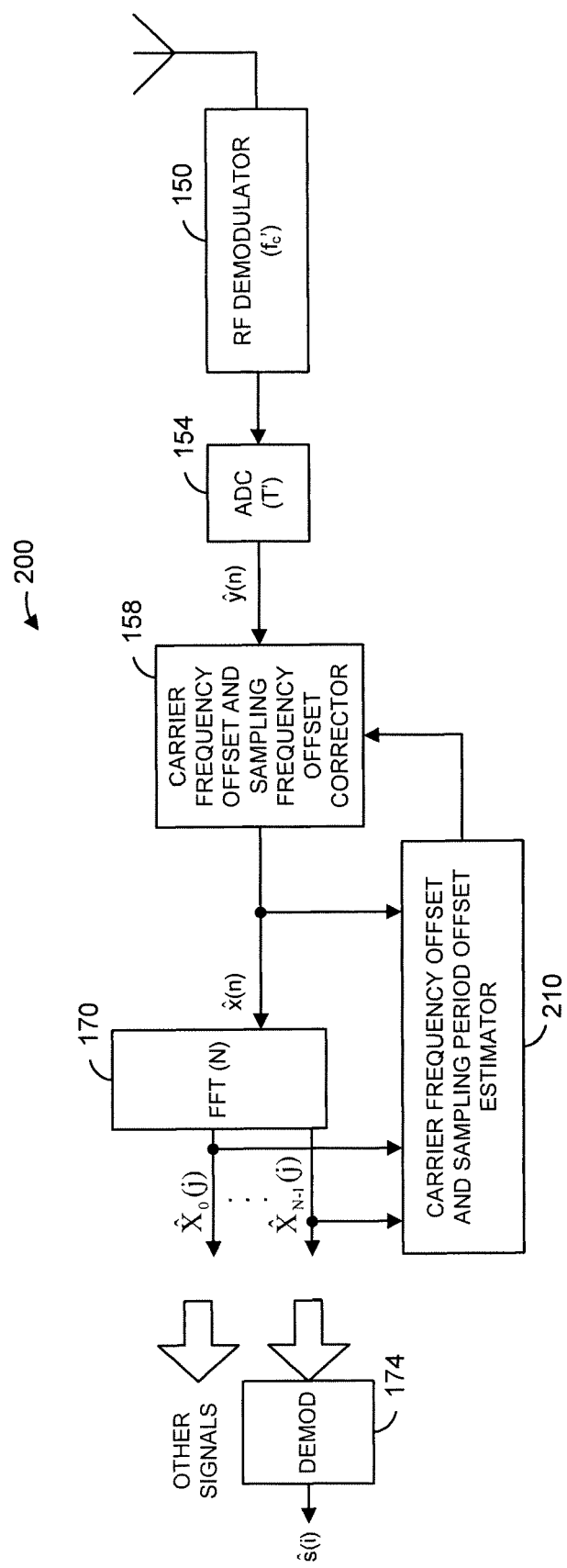
FIG. 2 is a block diagram of an example DVB receiver.

FIG. 2 is a block diagram of an example DVB receiver 200 that includes blocks similar to those of the receiver 108 in FIG. 1, and these blocks are like-numbered. The receiver 200 includes a carrier frequency offset and sampling period offset estimator 210 coupled to the ADC 154, the timing and frequency correction block 158 and the FFT block 170. The carrier frequency offset and sampling period offset estimator 210 estimates both $\Delta T$ and $\Delta f_c$ based on the signal $\hat{x}(n)$, the signal corresponding to the guard interval, and one or more of the signals $\hat{X}(j), \hat{X}_1(j), \ldots, \hat{X}_{N_v-1}(j)$. More specifically, the carrier frequency offset and sampling period offset estimator 210 calculates a phase difference $(\phi_{n+N} - \phi_n)$ between a sample of the cyclic prefix and the corresponding sample in the OFDM symbol based on the signal $\hat{x}(n)$ and the signal corresponding to the guard interval. Additionally, it calculates a phase difference $(\Phi_{k,m+N+M} - \Phi_{k,m})$ between a pilot corresponding to a first OFDM symbol and the same pilot, but corresponding to a second OFDM symbol, based on one or more of the signals $\hat{X}_0(j), \hat{X}(j), \ldots, \hat{X}_{N-1}(j)$. Based on these calculated phase differences, the carrier frequency offset and sampling period offset estimator 210 then calculates $\Delta T$ and $\Delta f_c$. For instance, it may calculate $\Delta T$ and $\Delta f_c$ according to the Equations 5 and 6, respectively.

The estimates of $\Delta T$ and $\Delta f_c$ are provided to the timing and frequency correction block 158. Optionally, the carrier frequency offset estimate $\Delta f_c$ may be provided to the RF demodulator 150 so that the RF demodulator 150 can adjust for the offset. Optionally, the sampling period offset estimate $\Delta T$ may be provided to the ADC 154 so that it can adjust its sampling frequency.

Figure 3:
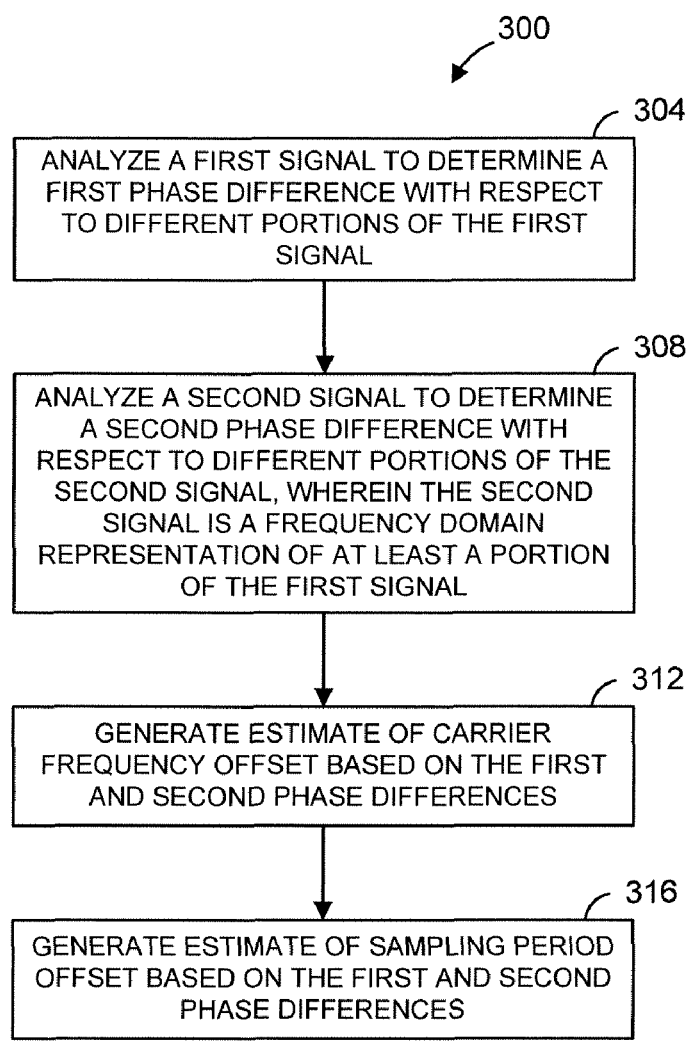
FIG. 3 is a flow diagram of an example method for determining estimates of a sampling period offset and a carrier frequency offset.

FIG. 3 is a flow diagram of an example method 300 that may be implemented by the carrier frequency offset and sampling period offset estimator 210 of FIG. 2. The method 300 will be described with reference to FIG. 2 for ease of explanation. Of course, one of ordinary skill in the art will recognize that the method 300 may be implemented in other systems as well. Similarly, one of ordinary skill in the art will recognize that the carrier frequency offset and sampling period offset estimator 210 may implement a method different than the method 300.

At a block 304, a first signal is analyzed to determine a first phase difference with respect to different portions of the first signal. In the receiver 200, for example, the signal generated by the ADC 154 may be analyzed to determine a phase difference $\phi_{n+N}-\phi_n$ between a sample of the cyclic prefix and the corresponding sample in the OFDM symbol. With respect to the receiver 200, the first signal may comprise the OFDM symbol signal $\hat{x}(n)$ and the signal corresponding to the guard interval.

At a block 308, a second signal is analyzed to determine a second phase difference with respect to different portions of the second signal. The second signal may be a frequency domain representation of at least a portion of the first signal. In the receiver 200, the second signal may comprise at least some of the outputs of the FFT block 170 (i.e., at least some of the signals $\hat{X}_0(j), \hat{X}_1(j), \ldots, \hat{X}_{N-1}(j)$). With respect to the receiver 200, at least some of the signals $\hat{X}_0(j), \hat{X}_1(j), \ldots, \hat{X}_{N-1}(j)$ may be analyzed to determine a phase difference $\Phi_{k,m+N+M}-\Phi_{k,m}$ between a pilot corresponding to a first OFDM symbol and the same pilot, but corresponding to a second OFDM symbol.

At a block 312, an estimate of the carrier frequency offset $\Delta f_c$ is generated based on the first phase difference calculated at the block 304 and the second phase difference calculated at the block 308. Generating the estimate of the carrier frequency offset $\Delta f_c$ may comprise generating the estimate according to the Equation 6, for example. Similarly, at a block 316, an estimate of the sampling period offset $\Delta T$ is generated based on the first phase difference calculated at the block 304 and the second phase difference calculated at the block 308. Generating the estimate of the sampling period offset $\Delta T$ may comprise generating the estimate according to the Equation 5, for example.

Figure 4:
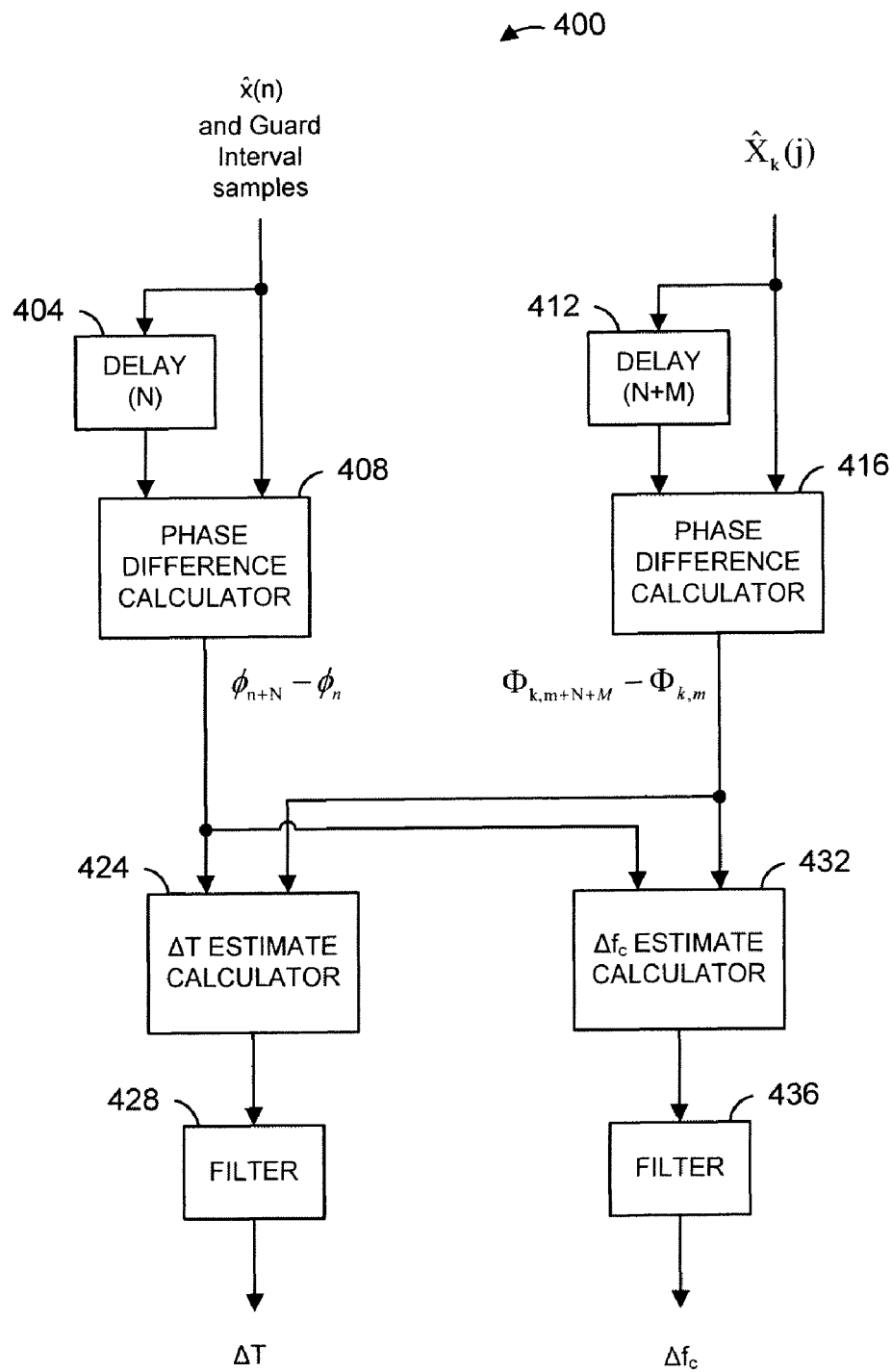
FIG. 4 is a block diagram of an example carrier frequency offset and sampling period offset estimator that may be utilized in the receiver of FIG. 2.

FIG. 4 is a block diagram of an example carrier frequency offset and sampling period offset estimator 400. The carrier frequency offset and sampling period offset estimator 210 of FIG. 2 may comprise the estimator 400 of FIG. 4, and the block diagram of FIG. 4 will be described with reference to FIG. 2 for ease of explanation. Of course, one of ordinary skill in the art will recognize that the estimator 400 may be implemented in other systems as well. Similarly, one of ordinary skill in the art will recognize that the carrier frequency offset and sampling period offset estimator 210 need not comprise the estimator 400, and may additionally or alternatively comprise other estimators. The estimator 400 may implement the method 300 of FIG. 3. Of course, one of ordinary skill in the art will recognize that the method 300 may be implemented by other systems as well.

The carrier frequency offset and sampling period offset estimator 400 comprises a delay element 404 that receives the OFDM symbol signal $\hat{x}(n)$ and the signal corresponding to the guard interval. The delay element 404 implements a delay equal to the OFDM symbol length, and this delay length is indicated in FIG. 4 as N. A phase difference calculator 408 is coupled to the delay element 404, and the calculator 408 also receives the OFDM symbol signal $\hat{x}(n)$ and the signal corresponding to the guard interval. The phase difference calculator 408 is configured to calculate phase differences ($\phi_{n+N}-\phi_n$) between samples of the cyclic prefix and the corresponding samples in the OFDM symbol.

The carrier frequency offset and sampling period offset estimator 400 also comprises a delay element 412 that receives at least some of the outputs generated by the FFT block 170. The delay element 412 implements a delay equal to the OFDM symbol length plus the guard interval length, and this delay length is indicated in FIG. 4 as N+M. A phase difference calculator 416 is coupled to the delay element 412, and the calculator 416 also receives at least some of the outputs generated by the FFT block 170. The phase difference calculator 416 is configured to calculate phase differences ($\Phi_{k,m+N+M}-\Phi_{k,m}$) between pilots corresponding to a first OFDM symbol and the same pilots, but corresponding to a second OFDM symbol. If there a multiple pilots utilized, the calculator 416 may calculate multiple phase differences per OFDM symbol.

A sampling period offset $\Delta T$ calculator 424 may be coupled to the phase difference calculator 408 and the phase difference calculator 416. The $\Delta T$ calculator 424 generates estimates of the sampling period offset $\Delta T$ based on phase differences calculated by the phase difference calculator 408 and the phase difference calculator 416. For example, the $\Delta T$ calculator 424 may calculate estimates of the sampling period offset $\Delta T$ based on Equation 5. A filter optionally may be included between the calculator 408 and the $\Delta T$ calculator 424. For example, such a filter could generate an average of phase differences generated by the calculator 408, and the $\Delta T$ calculator 424 could utilize the average phase difference value. Also, the $\Delta T$ calculator 424 may calculate a filtered or average value of the multiple $\Delta T$ estimates corresponding to the multiple phase differences calculated by the phase difference calculator 408.

Also, if there a multiple phase differences per OFDM symbol calculated by the phase difference calculator 416 corresponding to multiple pilots, the $\Delta T$ calculator 424 may calculate multiple estimates. Optionally, a filter may be included between the phase difference calculator 416 and the $\Delta T$ calculator 424. For example, such a filter could generate an average of phase differences generated by the calculator 416, and the $\Delta T$ calculator 424 could utilize the average phase difference value. Also, the $\Delta T$ calculator 424 may calculate a filtered or average value of the multiple $\Delta T$ estimates corresponding to the multiple phase differences calculated by the phase difference calculator 416.

A filter 428 optionally may be coupled to the $\Delta T$ calculator 424 and may filter the output of the $\Delta T$ calculator 424. For example, the filter 428 may implement a low-pass filter or some other suitable filter.

A carrier frequency offset $\Delta f_c$ calculator 432 may be coupled to the phase difference calculator 408 and the phase difference calculator 416. The $\Delta f_c$ calculator 432 generates estimates of the carrier frequency offset $\Delta f_c$ based on phase differences calculated by the phase difference calculator 408 and the phase difference calculator 416. For example, the $\Delta f_c$ calculator 432 may calculate estimates of the carrier frequency offset $\Delta f_c$ based on Equation 6. If there a multiple phase differences per OFDM symbol calculated by the phase difference calculator 416 corresponding to multiple pilots, the $\Delta f_c$ calculator 432 may calculate multiple estimates. Optionally, the $\Delta f_c$ calculator 432 may calculate an average of the multiple $\Delta f_c$ estimates corresponding to the multiple pilots.

A filter 436 optionally may be coupled to the $\Delta f_c$ calculator 432 and may filter the output of the $\Delta f_c$ calculator 432. For example, the filter 436 may implement a low-pass filter or some other suitable filter.

One of ordinary skill in the art will recognize many variations to the above-described apparatus and methods. As just one example, the frequency $f_c'$ may be calculated at the receiver in addition to or instead of $\Delta f_c$. Similarly, the sampling period T' may be calculated in addition to or instead of $\Delta T$. Additionally, a sampling frequency or sampling frequency offset may be calculated instead of a sampling period or sampling period offset.

Also, both offsets $\Delta f_c$ and $\Delta T$ need not be calculated using a technique such as described above. For instance, in some implementations, only one of the offsets $\Delta f_c$ and $\Delta T$ may be calculated using a technique such as described above, while the other offset may be calculated using another technique, such as a currently known technique.

The technique described above may be used to a calculate a sampling period and frequency offsets with respect to a transmitter sampling period and a transmitter frequency or with respect to a previously used receiver sampling period and a previously used receiver frequency. When calculating offsets with respect to previously used receiver values, the value T in equations 5 and 6 may be the previously used receiver sampling period.

Although the above methods and apparatus were described in the context of DVB, similar methods and apparatus may be utilized in other applications as well such as asymmetric digital subscriber line (ADSL), wireless local area network (WLAN) systems such as IEEE 802.11a and IEEE 802.11g systems, digital audio broadcast (DAB), WiMax (IEEE 802.16), mobile broadband wireless networks such as IEEE 802.20 systems, cellular communication systems, ultra wideband communication systems, power line communication systems, cable-based coax communication systems, etc. More generally, techniques such as described above can be utilized in any communication receiver that operates on both a signal and a frequency domain representation of the signal.

Figure 5A:
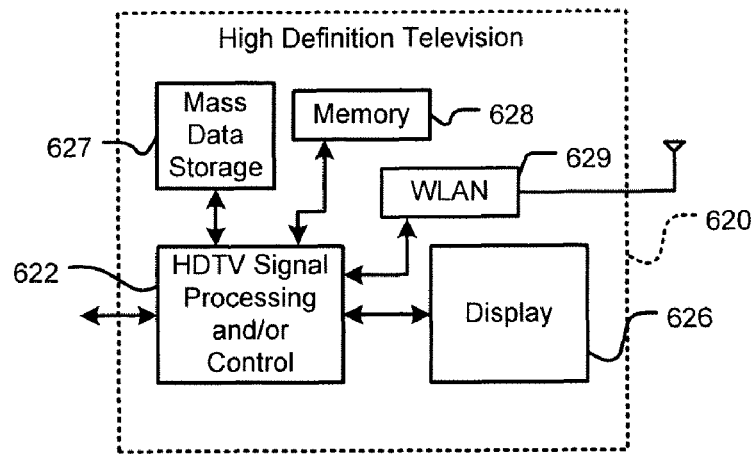
FIG. 5A is a block diagram of a high definition television that may utilize a carrier frequency offset and sampling period offset estimator.

Techniques such as described above can be utilized in a variety of OFDM-based communication systems, for example. Referring now to FIGS. 5A-5F, various example devices that may utilize carrier frequency offset and/or sampling period offset estimation techniques such as described above will be described. Referring to FIG. 5A, such techniques may be utilized in a high definition television (HDTV) 620. The HDTV 620 includes signal processing and/or control circuits, which are generally identified in FIG. 5A at 622, a WLAN interface 629, and a mass data storage 627. Carrier frequency offset and/or sampling period offset estimation techniques may be utilized in the WLAN interface 629 or the signal processing circuit and/or control circuit 622, for example. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. The mass data storage 627 may include one or more hard disk drives (HDDs) and/or one or more digital versatile disks (DVDs). One or more of the HDDs may be a mini HDD that includes one or more platters having a diameter that is smaller than approximately 1.8". HDTV 620 may be connected to memory 628 such as RAM, ROM, low latency nonvolatile memory such as flash memory and/or other suitable electronic data storage. HDTV 620 also may support connections with a WLAN via the WLAN network interface 629.

Figure 5B:
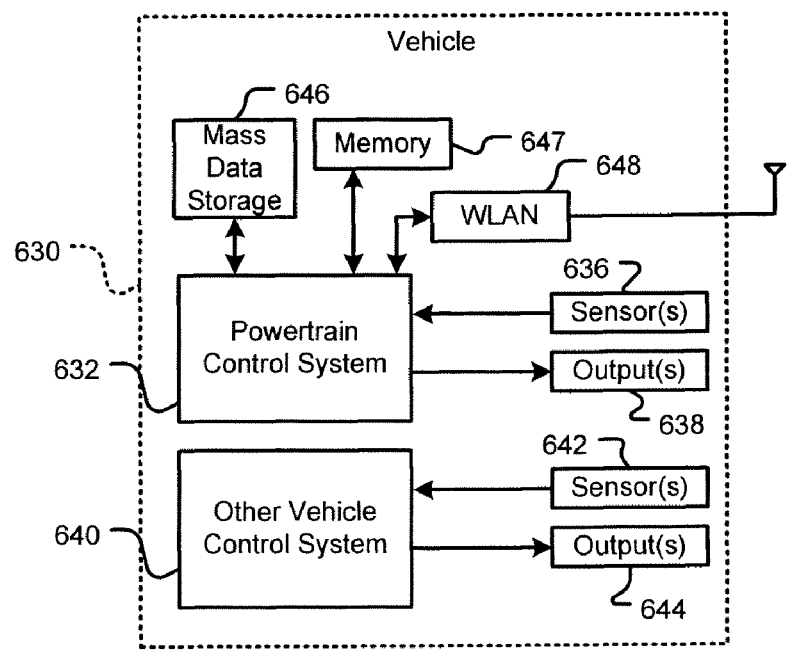
FIG. 5B is a block diagram of a vehicle that may utilize a carrier frequency offset and sampling period offset estimator.

Referring now to FIG. 5B, techniques such as described above may be utilized in a control system of a vehicle 630. In some implementations, a powertrain control system 632 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices for example hard disk drives HDD and/or DVDs. One or more of the HDDs may be a mini HDD that includes one or more platters having a diameter that is smaller than approximately 1.8". Powertrain control system 632 may be connected to memory 647 such as RAM, ROM, low latency nonvolatile memory such as flash memory and/or other suitable electronic data storage. Powertrain control system 632 also may support connections with a WLAN via a WLAN network interface 648. Carrier frequency offset and/or sampling period offset estimation techniques such as described above may be implemented in the WLAN interface 648. The control system 640 may also include mass data storage, memory and/or a WLAN interface (all not shown).

Figure 5C:
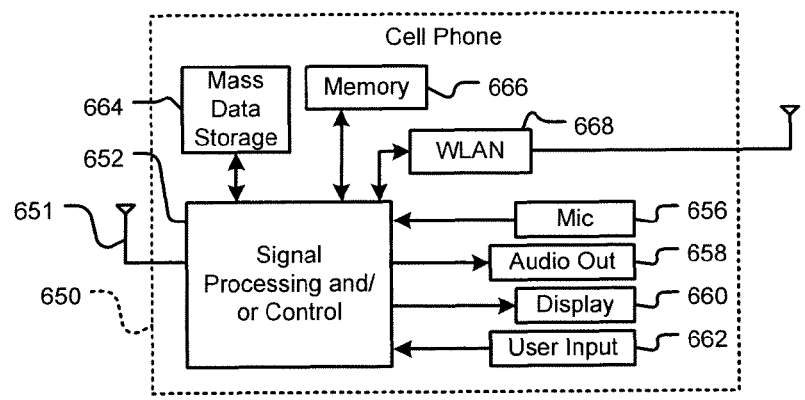
FIG. 5C is a block diagram of a cellular phone that may utilize a carrier frequency offset and sampling period offset estimator.

Referring now to FIG. 5C, techniques such as described above may also be utilized in a cellular phone 650 that may include a cellular antenna 651. The cellular phone 650 includes signal processing and/or control circuits, which are generally identified in FIG. 5C at 652, a WLAN interface 668, and a mass data storage 664. Carrier frequency offset and/or sampling period offset estimation techniques may be implemented in the signal processing and/or control circuits 652 and/or the WLAN interface 668, for example. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 650 may be connected to memory 666 such as RAM, ROM, low latency nonvolatile memory such as flash memory and/or other suitable electronic data storage. Cellular phone 650 also may support connections with a WLAN via a WLAN network interface 668.

Figure 5D:
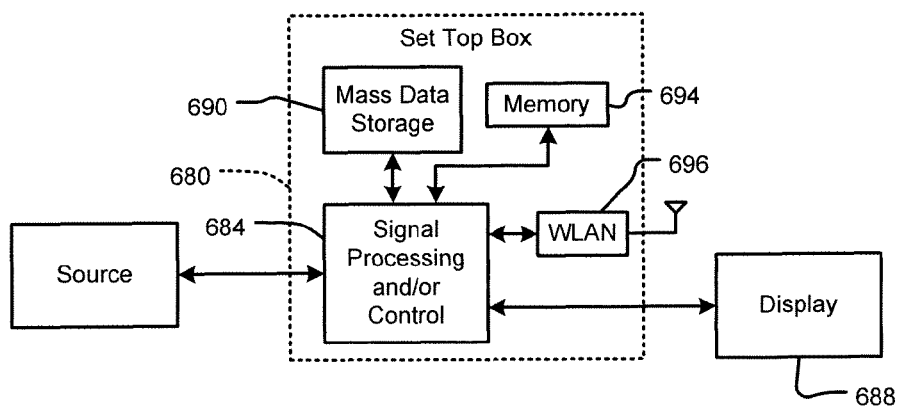
FIG. 5D is a block diagram of a set top box that may utilize a carrier frequency offset and sampling period offset estimator.

Referring now to FIG. 5D, techniques such as described above may be utilized in a set top box 680. The set top box 680 includes signal processing and/or control circuits, which are generally identified in FIG. 5D at 684, a WLAN interface 696, and a mass data storage device 690. Carrier frequency offset and/or sampling period offset estimation techniques may be implemented in the signal processing and/or control circuits 684 and/or the WLAN interface 696, for example. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may be a mini HDD that includes one or more platters having a diameter that is smaller than approximately 1.8". Set top box 680 may be connected to memory 694 such as RAM, ROM, low latency nonvolatile memory such as flash memory and/or other suitable electronic data storage. Set top box 680 also may support connections with a WLAN via the WLAN network interface 696.

Figure 5E:
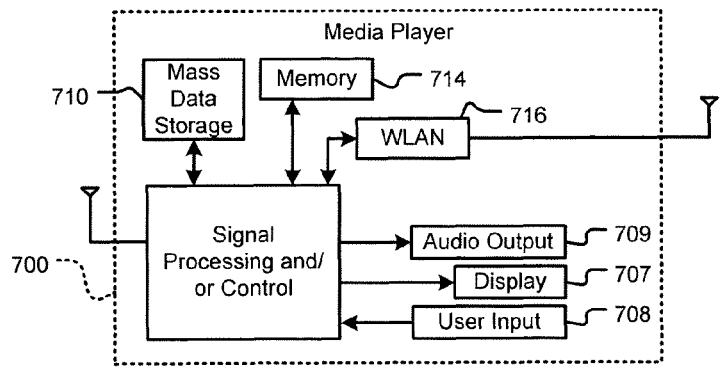
FIG. 5E is a block diagram of a media player that may utilize a carrier frequency offset and sampling period offset estimator.

Referring now to FIG. 5E, techniques such as described above may be utilized in a media player 700. The media player 700 may include signal processing and/or control circuits, which are generally identified in FIG. 5E at 704, a WLAN interface 716, and a mass data storage device 710. Carrier frequency offset and/or sampling period offset estimation techniques may be implemented in the signal processing and/or control circuits 704 and/or the WLAN interface 716, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Figure 5F:
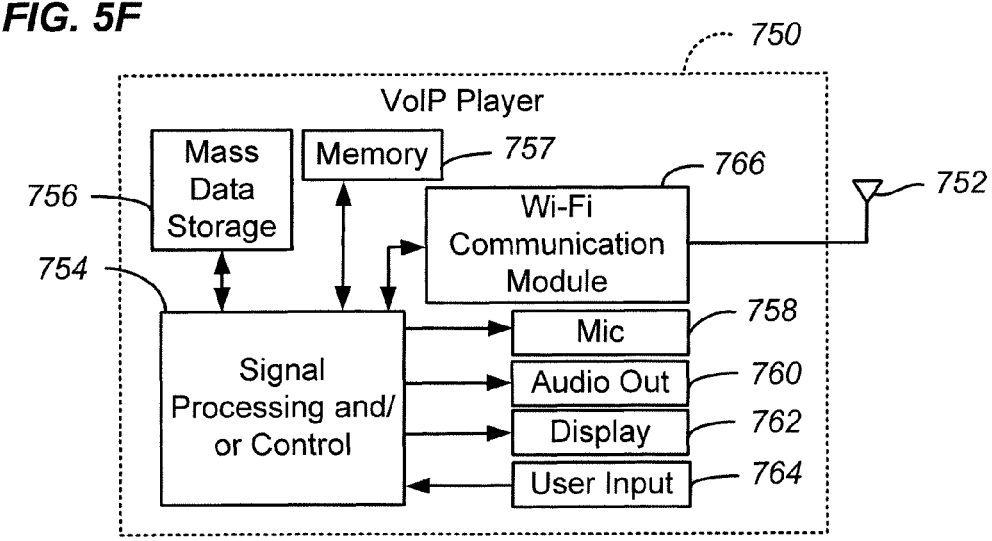
FIG. 5F is a block diagram of a voice over IP device that may utilize a carrier frequency offset and sampling period offset estimator.

Referring to FIG. 5F, techniques such as described above may be utilized in a Voice over Internet Protocol (VoIP) phone 750 that may include an antenna 754, signal processing and/or control circuits 758, a wireless interface 762, and a mass data storage 766. Carrier frequency offset and/or sampling period offset estimation techniques described above may be implemented in the signal processing and/or control circuits 758 and/or the wireless interface 762, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

VoIP phone 750 may communicate with mass data storage 766 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 750 may be connected to memory 786, which may be a RAM, ROM, low latency nonvolatile memory such as flash memory and/or other suitable electronic data storage. VoIP phone 750 is configured to establish communications link with a VoIP network (not shown) via Wi-Fi communication module 762.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for determining timing information in a receiver, comprising:
   analyzing a first signal to determine a first phase difference with respect to different portions of the first signal;
   analyzing a second signal to determine a second phase difference with respect to different portions of the second signal, wherein the second signal is a frequency domain representation of at least a portion of the first signal; and
   generating an indication of a sampling period offset based on the first phase difference and the second phase difference.

2. A method according to claim 1, wherein generating the indication of the sampling period offset comprises generating at least one of i) an estimate of a receiver sampling period offset, ii) an estimate of a receiver sampling period, an estimate of a transmitter sampling period, iii) an estimate of a receiver sampling frequency offset, iv) an estimate of a receiver sampling frequency, and v) an estimate of a transmitter sampling frequency.

3. A method according to claim 1, wherein the first signal comprises an orthogonal frequency-division multiplexing (OFDM) signal demodulated from a radio frequency carrier.

4. A method according to claim 3, wherein analyzing the first signal to determine the first phase difference includes determining a phase difference with respect to a sample in a cyclic prefix and a corresponding sample in an OFDM symbol.

5. A method according to claim 4, wherein analyzing the second signal to determine the second phase difference includes determining a phase difference with respect to a pilot signal in the OFDM symbol and a pilot signal in another OFDM symbol.

6. A method according to claim 5, wherein analyzing the second signal to determine the second phase difference includes determining respective phase differences with respect to a plurality of pilot signals in the OFDM symbol and a plurality of pilot signals in another OFDM symbol.

7. A method according to claim 5, wherein generating the indication of the sampling period offset comprises generating an estimate of the sampling period offset.

8. A method according to claim 7, further comprising filtering a plurality of generated estimates of the sampling period offset.

9. A method according to claim 7, wherein generating the estimate of the sampling period offset comprises generating the estimate of the sampling period offset $\Delta T$ according to the equation:

$$\Delta T = \left[ Y \frac{N}{N+M} - X \right] \frac{T}{2\pi k}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

10. A method according to claim 9, wherein T is one of a sampling period corresponding to a transmitter or a previously used sampling period of the receiver.

11. A method according to claim 9, wherein X is an average of multiple first phase difference values.

12. A method according to claim 9, wherein Y is an average of multiple second phase difference values.

13. A method according to claim 9, further comprising generating an indication of a carrier frequency offset based on the first phase difference and the second phase difference.

14. A method according to claim 13, wherein generating the indication of the carrier frequency offset comprises generating an estimate of the carrier frequency offset $\Delta f_c$ according to the equation:

$$\Delta f_c = \frac{k(N+M)X}{[YN - X(N+M) + 2\pi k(N+M)]NT}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

15. A method for determining timing information in a receiver, comprising:
analyzing a first signal to determine a first phase difference with respect to different portions of the first signal;
analyzing a second signal to determine a second phase difference with respect to different portions of the second signal, wherein the second signal is a frequency domain representation of at least a portion of the first signal; and
generating an indication of a carrier frequency offset based on the first phase difference and the second phase difference.

16. A method according to claim 15, wherein generating the indication of the carrier frequency offset comprises generating at least one of i) an estimate of a receiver carrier frequency offset, ii) an estimate of a receiver carrier frequency reference, and iii) an estimate of a transmitter carrier frequency.

17. A method according to claim 15, wherein the first signal comprises an orthogonal frequency-division multiplexing (OFDM) signal demodulated from a radio frequency carrier;
wherein analyzing the first signal to determine the first phase difference includes determining a phase difference with respect to a sample in a cyclic prefix and a corresponding sample in an OFDM symbol;
wherein analyzing the second signal to determine the second phase difference includes determining a phase difference with respect to a pilot signal in the OFDM symbol and a pilot signal in another OFDM symbol.

18. A method according to claim 17, wherein generating the indication of the carrier frequency offset comprises generating an estimate of the carrier frequency offset $\Delta f_c$ according to the equation:

$$\Delta f_c = \frac{k(N+M)X}{[YN - X(N+M) + 2\pi k(N+M)]NT}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

19. A method according to claim 18, wherein T is one of a sampling period corresponding to a transmitter or a previously used sampling period of the receiver.

20. A method according to claim 18, wherein X is an average of multiple first phase difference values.

21. A method according to claim 18, wherein Y is an average of multiple second phase difference values.

22. A method according to claim 15, further comprising filtering a plurality of generated estimates of the carrier frequency offset.

23. An apparatus for calculating timing information for a receiver, the apparatus comprising:
a first phase difference calculator to calculate a first phase difference with respect to different portions of a first signal;
a second phase difference calculator to calculate a second phase difference with respect to different portions of a second signal, wherein the second signal is a frequency domain representation of at least a portion of the first signal; and
a sampling period offset information calculator to generate an indication of a sampling period offset based on the first phase difference and the second phase difference.

24. An apparatus according to claim 23, wherein the sampling period offset information calculator is configured to generate at least one of i) an estimate of a receiver sampling period offset, ii) an estimate of a receiver sampling period, iii)

an estimate of a transmitter sampling period, iv) an estimate of a receiver sampling frequency offset, an v) estimate of a receiver sampling frequency, and an estimate of a transmitter sampling frequency.

25. An apparatus according to claim 23, wherein the first signal comprises an orthogonal frequency-division multiplexing (OFDM) signal demodulated from a radio frequency carrier.

26. An apparatus according to claim 25, further comprising a first delay element having an input to receive the first signal and an output coupled to the first phase difference calculator, the first delay element providing a delay equal to the length of one OFDM symbol;
    wherein the first phase difference calculator is configured to determine a phase difference with respect to a sample in a cyclic prefix and a corresponding sample in an OFDM symbol.

27. An apparatus according to claim 26, further comprising a second delay element having an input to receive the second signal and an output coupled to the second phase difference calculator, the second delay element providing a delay equal to the length of one OFDM symbol plus the length of one guard interval;
    wherein the second phase difference calculator is configured to determine a phase difference with respect to a pilot signal in the OFDM symbol and a pilot signal in another OFDM symbol.

28. An apparatus according to claim 27, wherein the second phase difference calculator is configured to determine respective phase differences with respect to a plurality of pilot signals in the OFDM symbol and a plurality of pilot signals in another OFDM symbol.

29. An apparatus according to claim 27, further comprising a filter having an input coupled to an output of the sampling period offset information calculator.

30. An apparatus according to claim 27, wherein the sampling period offset information calculator is configured to generate an estimate of a sampling period offset $\Delta T$ according to the equation:

$$\Delta T = \left[ Y \frac{N}{N+M} - X \right] \frac{T}{2\pi k}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

31. An apparatus according to claim 30, wherein T is one of a sampling period corresponding to a transmitter or a previously used sampling period of the receiver.

32. An apparatus according to claim 30, further comprising a carrier frequency offset information calculator to generate an indication of a carrier frequency offset based on the first phase difference and the second phase difference.

33. An apparatus according to claim 32, wherein the carrier frequency offset information calculator is configured to generate an estimate of the carrier frequency offset $\Delta f_c$ according to the equation:

$$\Delta f_c = \frac{k(N+M)X}{[YN - X(N+M) + 2\pi k(N+M)]NT}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

34. An apparatus according to claim 33, further comprising a filter having an input coupled to an output of the carrier frequency offset information calculator.

35. An apparatus according to claim 33, further comprising a filter coupled between the first phase difference calculator and the sampling period offset information calculator and between the first phase difference calculator and the carrier frequency offset information calculator, wherein X is a filtered value of multiple first phase difference values.

36. An apparatus according to claim 33, further comprising a filter coupled between the second phase difference calculator and the sampling period offset information calculator and between the second phase difference calculator and the carrier frequency offset information calculator, wherein Y is filtered value of multiple second phase difference values.

37. A method for receiving an orthogonal frequency-division multiplexing (OFDM) signal, comprising:
    demodulating a received radio frequency (RF) signal;
    analog-to-digital converting the RF demodulated signal to generate an OFDM signal;
    analyzing the OFDM signal to determine a first phase difference with respect to different portions of the OFDM signal;
    performing a Fourier transform operation on at least a portion of the OFDM signal to generate a Fourier transformed signal;
    analyzing the Fourier transformed signal to determine a second phase difference with respect to different portions of the Fourier transformed signal; and
    generating an indication of a sampling period offset based on the first phase difference and the second phase difference; and
    compensating for the sampling period offset based on the indication of the sampling period offset.

38. A method according to claim 37, wherein analyzing the OFDM signal to determine the first phase difference includes determining a phase difference with respect to a sample in a cyclic prefix and a corresponding sample in an OFDM symbol;
    wherein analyzing the Fourier transformed signal to determine the second phase difference includes determining a phase difference with respect to a pilot signal in the OFDM symbol and the pilot signal in another OFDM symbol.

39. A method according to claim 38, wherein generating the indication of the sampling period offset comprises generating an estimate of the sampling period offset, the method further comprising filtering a plurality of generated estimates of the sampling period offset.

40. A method according to claim 38, wherein generating the estimate of the sampling period offset comprises generating an estimate of the sampling period offset $\Delta T$ according to the equation:

$$\Delta T = \left[ Y \frac{N}{N+M} - X \right] \frac{T}{2\pi k}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

41. A method according to claim 37, wherein compensating for the sampling period offset comprises processing the OFDM signal.

42. A method according to claim 37, wherein compensating for the sampling period offset comprises adjusting an analog-to-digital converter.

43. A method according to claim 37, further comprising generating an indication of a carrier frequency offset based on the first phase difference and the second phase difference; and
compensating for the carrier frequency offset based on the indication of the carrier frequency offset.

44. A method according to claim 43, wherein generating the indication of the carrier frequency offset comprises generating an estimate of the carrier frequency offset $\Delta f_c$ according to the equation:

$$\Delta f_c = \frac{k(N+M)X}{[YN - X(N+M) + 2\pi k(N+M)]NT}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

45. A method according to claim 43, wherein compensating for the carrier frequency offset comprises processing the OFDM signal.

46. A method according to claim 43, wherein compensating for the sampling period offset comprises adjusting the RF demodulator.

47. A method for receiving an orthogonal frequency-division multiplexing (OFDM) signal, comprising:
demodulating a received radio frequency (RF) signal;
analog-to-digital converting the RF demodulated signal to generate an OFDM signal;
analyzing the OFDM signal to determine a first phase difference with respect to different portions of the OFDM signal;
performing a Fourier transform operation on at least a portion of the OFDM signal to generate a Fourier transformed signal;
analyzing the Fourier transformed signal to determine a second phase difference with respect to different portions of the Fourier transformed signal; and
generating an indication of a carrier frequency offset based on the first phase difference and the second phase difference; and
compensating for the carrier frequency offset based on the indication of the carrier frequency offset.

48. A method according to claim 47, wherein analyzing the OFDM signal to determine the first phase difference includes determining a phase difference with respect to a sample in a cyclic prefix and a corresponding sample in an OFDM symbol;
wherein analyzing the Fourier transformed signal to determine the second phase difference includes determining a phase difference with respect to a pilot signal in the OFDM symbol and a pilot signal in another OFDM symbol.

49. A method according to claim 48, wherein generating the indication of the carrier frequency offset comprises generating an estimate of the carrier frequency offset $\Delta f_c$ according to the equation:

$$\Delta f_c = \frac{k(N+M)X}{[YN - X(N+M) + 2\pi k(N+M)]NT}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

50. An orthogonal frequency-division multiplexing (OFDM) receiver apparatus, comprising:
a radio frequency (RF) demodulator;
an analog-to-digital converter (ADC) having an input coupled to an output of the RF demodulator;
a Fourier transform calculator having an input coupled to an output of the ADC;
a quadrature amplitude modulation (QAM) demodulator having an input coupled to an output of the Fourier transform calculator;
a first phase difference calculator coupled to output of the ADC, the first phase difference calculator to determine a first phase difference with respect to different portions of an OFDM signal;
a second phase difference calculator coupled to output of the Fourier transform calculator, the second phase difference calculator to determine a second phase difference with respect to a frequency domain representation of at least a portion of the OFDM signal;
a sampling period offset calculator to generate an indication of a sampling period offset based on the first phase difference and the second phase difference; and
a timing correction device to compensate for the sampling period offset based on the indication of the sampling period offset generated by the sampling period offset calculator.

51. An apparatus according to claim 50, further comprising a first delay element having an input coupled to the output of the ADC and an output coupled to the first phase difference calculator, the first delay element providing a delay equal to the length of one OFDM symbol;
wherein the first phase difference calculator is configured to determine a phase difference with respect to a sample in a cyclic prefix and a corresponding sample in an OFDM symbol.

52. An apparatus according to claim 51, further comprising a second delay element having an input coupled to the output of the Fourier transform calculator and an output coupled to the second phase difference calculator, the second delay element providing a delay equal to the length of one OFDM symbol plus the length of one guard interval;
wherein the second phase difference calculator is configured to determine a phase difference with respect to a pilot signal in the OFDM symbol and a pilot signal in another OFDM symbol.

53. An apparatus according to claim 52, further comprising a filter having an input coupled to an output of the sampling period offset information calculator.

54. An apparatus according to claim 52, wherein the sampling period offset information calculator is configured to generate an estimate of a sampling period offset $\Delta T$ according to the equation:

$$\Delta T = \left[Y\frac{N}{N+M} - X\right]\frac{T}{2\pi k}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

55. An apparatus according to claim 52, further comprising a carrier frequency offset information calculator to generate an indication of a carrier frequency offset based on the first phase difference and the second phase difference;
  wherein the timing correction device is configured to compensate for the carrier frequency offset based on the indication of the carrier frequency offset generated by the carrier frequency offset information calculator.

56. An apparatus according to claim 55, wherein the carrier frequency offset information calculator is configured to generate an estimate of the carrier frequency offset $\Delta f_c$ according to the equation:

$$\Delta f_c = \frac{k(N+M)X}{[YN - X(N+M) + 2\pi k(N+M)]NT}$$

where X is the first phase difference, Y is the second phase difference, T is a sampling period, N is a length of OFDM symbols, M is a length of a guard interval, and k is an index indicative of the frequency of the pilot signal to which the second phase difference corresponds.

57. An apparatus according to claim 55, further comprising a filter having an input coupled to an output of the carrier frequency offset information calculator.

58. An apparatus according to claim 55, wherein the timing correction device is coupled to the RF demodulator, the timing correction device being configured to adjust the RF demodulator to compensate for the carrier frequency offset.

59. An apparatus according to claim 55, wherein the timing correction device is coupled to the output of the ADC and the input of the Fourier transform calculator, the timing correction device being configured to process the OFDM signal to compensate for the carrier frequency offset.

60. An apparatus according to claim 50, wherein the timing correction device is coupled to the ADC, the timing correction device being configured to adjust the ADC to compensate for the sampling period offset.

61. An apparatus according to claim 50, wherein the timing correction device is coupled to the output of the ADC, the timing correction device being configured to process the OFDM signal to compensate for the sampling period offset.

\* \* \* \* \*